(12) United States Patent
Karlsson (10) Patent No.: US 6,662,896 B1
(45) Date of Patent: Dec. 16, 2003

(54) TRANSMISSION FOR CARS (75) Inventor: Mats Karlsson, Säffle (SE)

(73) Assignee: UNIC Aktiebolag (SE)

( * ) Notice: Subject to any disclaimer, the term of this patent is extended or adjusted under 35 U.S.C. 154(b) by 0 days.

(21) Appl. No.: 09/869,108

(22) PCT Filed: Dec. 22, 1999

(86) PCT No.: PCT/SE99/02459
§ 371 (c)(1),
(2), (4) Date: Jun. 22, 2001

(87) PCT Pub. No.: WO00/39486
PCT Pub. Date: Jul. 6, 2000

(30) Foreign Application Priority Data

Dec. 23, 1998 (SE) .............................. 9804560

(51) Int. Cl.$^7$ .............................................. B60K 17/00
(52) U.S. Cl. ................... 180/348; 180/371; 180/378; 180/356
(58) Field of Search ............................. 180/65.6, 65.7, 180/348, 356, 371, 378

(56) References Cited

U.S. PATENT DOCUMENTS

| 4,402,237 A | * | 9/1983 | Tomlinson ................... 475/205 |
| 4,417,642 A | * | 11/1983 | Suzuki et al. ............... 180/249 |
| 4,433,547 A | * | 2/1984 | Firey ......................... 290/4 C |
| 4,449,604 A | * | 5/1984 | Suzuki ....................... 180/233 |
| 4,457,394 A | | 7/1984 | Suzuki ....................... 180/247 |
| 4,580,402 A | * | 4/1986 | Firey ......................... 290/4 C |
| 4,663,713 A | * | 5/1987 | Cornell et al. .............. 123/361 |
| 4,693,334 A | | 9/1987 | Hiraiwa ...................... 180/249 |
| 5,011,463 A | * | 4/1991 | Jarchow et al. ............... 475/74 |
| 5,135,071 A | * | 8/1992 | Shibahata et al. .......... 180/249 |
| 5,222,921 A | * | 6/1993 | Garcia ........................ 475/72 |
| 5,409,425 A | * | 4/1995 | Shibahata ................... 475/150 |
| 5,466,197 A | * | 11/1995 | Mitsuya et al. ............... 475/72 |
| 5,484,344 A | * | 1/1996 | Ra et al. ..................... 475/221 |
| 5,525,116 A | * | 6/1996 | Ra et al. ..................... 475/275 |
| 5,591,097 A | * | 1/1997 | Petri et al. .................. 475/207 |
| 5,695,422 A | * | 12/1997 | Otten ......................... 475/72 |
| 5,772,548 A | * | 6/1998 | Park ........................... 475/44 |
| 5,830,102 A | * | 11/1998 | Coffey ........................ 475/285 |
| 5,947,855 A | * | 9/1999 | Weiss ......................... 180/65.2 |
| 5,951,432 A | * | 9/1999 | Wehking et al. ............. 475/280 |
| 6,071,208 A | * | 6/2000 | Koivunen .................... 475/275 |
| 6,193,629 B1 | * | 2/2001 | Tenzor et al. ............... 192/108 |
| 6,286,379 B1 | * | 9/2001 | Yester et al. ................ 475/204 |
| 6,387,006 B1 | * | 5/2002 | Jung .......................... 475/207 |
| 6,409,622 B1 | * | 6/2002 | Bolz et al. ................... 475/290 |
| 6,427,735 B1 | * | 8/2002 | Brazell et al. ............. 144/114.1 |

FOREIGN PATENT DOCUMENTS

| EP | 0 111 037 A1 | 6/1984 | .......... F16H/37/04 |
| EP | 0 117 945 A2 | 9/1984 | ............ F16H/3/52 |
| GB | 2 105 664 A | 9/1998 | .......... B60K/17/34 |
| WO | WO 93/39486 | 7/2000 | .......... F16H/37/04 |

* cited by examiner

Primary Examiner—Paul N. Dickson
Assistant Examiner—Toan To
(74) Attorney, Agent, or Firm—George T. Marcou; Kilpatrick Stockton LLP (57) ABSTRACT The present invention relates to a transmission for cars, preferably with driving of the front wheels, comprising an engine (2), a gearbox (8), a final gear (20), first link mechanisms (16A, 16B) which connect each axle shaft (12A, 12B) to said final gear (20), second link mechanisms (18A, 18B) which connect the other end of each of said axle shafts (12A, 12B) to its driving wheel (6) and preferably an intermediate transmission (4) between the engine and the gearbox (8), said final gear comprising two planetary gears (20A, 20B) which give an exchange gear reduction of between 1.2:1 and 10:1.

18 Claims, 9 Drawing Sheets

TRANSMISSION FOR CARS

TECHNICAL FIELD

The present invention relates to a transmission for cars and also how such a transmission is disposed in an advantageous manner in relation to the vehicle's driving wheels.

DESCRIPTION OF PRIOR ART AND PROBLEMS

It is a generally known trend that more and more car manufacturers are abandoning rear-wheel drive and instead are electing to have front-wheel drive and/or four-wheel drive. There are many advantages in having front-wheel drive compared with rear-wheel drive. One of them is that no propeller shaft or rear wheel transmission is required, creating extra room for passenger space and luggage space. One disadvantage of front-wheel drive is that the front wheel transmission on the one hand in the form of the gearbox itself, and on the other in the form of the final gear between the gearbox and the axle shafts, needs space and that this space requirement is directly adjacent to the engine. This can cause difficulties, particularly in connection with larger transverse engines, as the space for the gearbox is limited by the car's track width, steering deflection etc. if it is to be positioned conventionally at one end of the crankshaft.

A gearbox is previously known from WO-9713990 which is intended to solve the aforementioned problems due to the fact that the gearbox is fitted with two parallel secondary shafts, which results in a considerable shortening of the construction length of the gearbox compared with a conventional design. However, a solution of this kind means that only the rotation of one of the secondary shafts performs usefull work at a time, while the other secondary shaft rotates in a void at an unfavourable gear ratio. It is thus unavoidable that such a solution causes certain energy losses. From the installation point of view also, a gearbox of this kind is disadvantageous in that the length of one axle shaft is limited, which can cause the axle joints to have to work in an unfavourable deflection range to provide sufficient wheel suspension play of the driving wheels.

Furthermore, the final gear in itself causes a problem in that it cannot be positioned according to the conventional art coaxially with the secondary shaft of the gearbox, resulting in difficulties in connection with any ambition to be able to construct compact gearboxes. A further problem with the conventional art is that it is not possible without major interference to change the gear ratio in an existing transmission, and often is virtually impossible to change before the primary shaft. Finally, it is the case that conventional gearboxes are difficult to fit with a controlled differential mechanism.

Another problem facing car manufacturers today is that cars which are built on the same sort of chassis are offered with a number of engine alternatives, The speed interval normally lies within varying ranges for different engine alternatives, making it difficult to use the same gearboxes. The problem is accentuated most when both diesel and petrol engines are offered, as a diesel engine has its power optimum at a speed which is considerably lower than a petrol engine, meaning that the petrol engine's gearbox with optimal gear reduction is under-dimensioned for the diesel engine.

Finally, it is advantageous if a gearbox together with the engine forms a common preferably compact, assembly unit, in order to be able to optimise the unit from the assembly point of view.

BRIEF ACCOUNT OF THE INVENTION

The object of the present invention is to eliminate or at least reduce some of the aforementioned problems, which is achieved by means of a transmission for cars, preferably with driving of the front wheels, comprising an engine, a gearbox, a final gear, first link mechanisms which connect each axle shaft to said final gear, second link mechanisms which connect the other end of each of said axle shafts to their driving wheel and preferably an intermediate transmission between the engine and the gearbox, characterized in that said final gear comprises two planetary gears which give an exchange gear reduction of between 1.2:1 and 10:1.

By means of the solution according to the invention, the great advantage is achieved that the gearbox with final gear forms a mare compact and installation-friendly unit which results in the fact that it can be fitted transversely between the driving wheels and at the same time can obtain sufficient space for axle shafts with link mechanisms, which allow the necessary wheel suspension play of the driving wheels at the same time as it can be positioned to one side of the engine instead of at one end of it as according to the conventional art. This means that the engine design is not restricted to the same extent by restrictions on construction length, so that it can be constructed with greater freedom. It is certainly previously known in itself to have planetary gears for operating heavier vehicles, these being mounted directly on the driving wheel or close to it with a view to providing a further large gear reduction of the speed and in most cases also to reduce the load on the axle shaft. Thus a different problem to the present invention and for a quite different purpose, and not a comparable solution either.

According to a further aspect of the invention, a manual gearbox is used and the exchange gear reduction is either adapted in an intermediate transmission and/or in the planetary gear to the engine's optimum speed range, so that the same kind of primary shaft and gear and the same kind of secondary shaft and gear can be used in the optimum manner for several kinds of engine with different kinds of speed range However, it is best if the same planetary gear is used which inter alia facilitates more rational production, adaptation being performed in the intermediate transmission which can be disposed in a very easily accessible and easily replaceable manner According to further aspects according to the invention, it holds good that;

said planetary gears provide an exchange gear reduction of at least 2:1, and more preferably approx. 3–5:1.

said link mechanisms consist of conventional axle joints.

the secondary shaft is disposed parallel to at least one imaginary plane which either comprises the fulcrum for both driving wheels or the horizontal plane of the chassis.

the secondary shaft is disposed parallel to both aforementioned planes.

said planetary gear comprises a planet holder, a ring wheel and a sun wheel, and gear wheels supported on the planet holder, one of the planet holder, ring wheel or sun wheel being fixedly connected to, or fixed rotatably on, another fixed part forming part of the car, preferably the gearbox casing, while a second part is connected to the secondary shaft and a third part is connected to an axle shaft.

the length of an axle shaft with link mechanism is between 100–1000 mm, preferably between 200–700 mm (the distance between the hinge centre of the link mechanisms 16, 18 being intended)

the ring wheel is disposed fixedly or rotatably on the casing.

the gearbox is fitted in an engine compartment together with a transverse engine.

there is also a backwardly disposed transmission from the gearbox, the exchange gear reduction for the backwardly outgoing transmission corresponding to the exchange gear reduction from the planetary gear to the forward axle shaft, so that four-wheel drive can be obtained with the same speed at the front and back wheels.

a differential lock or controlled differential mechanism is disposed on the gearbox in interaction with said planetary gears, preferably via the ring wheel.

the exchange gear ratio in the intermediate transmission and/or the planetary gear is adapted to the optimum speed range of the engine, so that the same kind of primary shaft and gear and the same kind of secondary shaft and gear can be used in the optimum manner for several kinds of engines with different kinds of speed ranges.

the gearbox comprises a primary shaft with input gear and a secondary shaft with output gear.

said secondary shaft is disposed transverse to the longitudinal direction of the vehicle and placed in an area between the driving wheels.

the planetary gears are disposed coaxially in relation to said secondary shaft.

BRIEF DESCRIPTION OF DRAWINGS

The invention will be described below in greater detail with reference to the enclosed drawings, in which.

DETAILED DESCRIPTION

Figure 1:
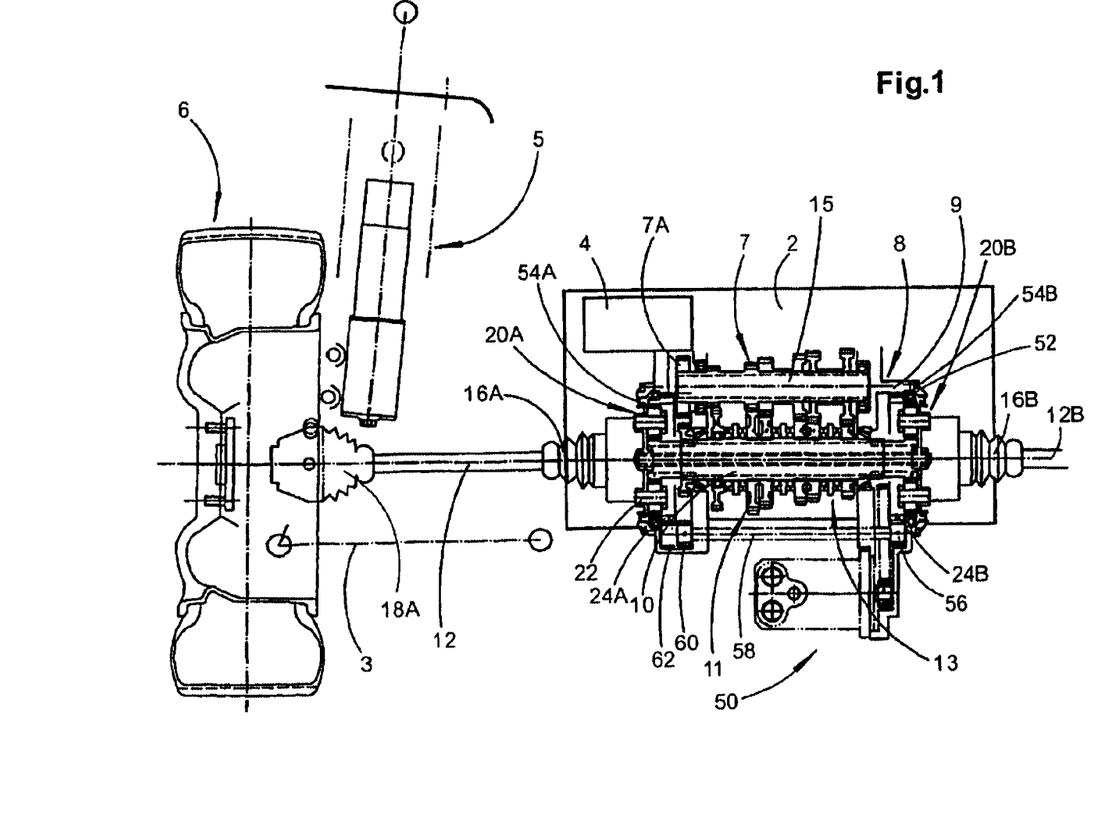
FIG. 1 shows a view along the vertical plane of essential parts of a car which has a transmission according to the invention.

FIG. 1 shows a preferred embodiment of a transmission according to the invention. The transmission is disposed in a car with driving wheels 6. The spring/shock absorber 5 and the control arm 3 are shown diagrammatically. An engine 2 is shown diagrammatically, which in the view shown lies behind a gearbox 8, with a casing 9. The gearbox 8 has a primly shaft 15. Disposed between the engine 2 and the primary shaft 15 for the gearbox 8 is an intermediate transmission 4 (shown diagrammatically), which is best formed in a known manner consisting of a simple gear transmission which gives the desired exchange gear reduction (in most cases approx. 1:2–2:1) and is not therefore shown in detail. A clutch (not shown) of a known fundamental design is preferably disposed between the engine 2 and the intermediate transmission 4. At best, the engine 2, intermediate transmission 4 and gearbox 8 form an assembled unit to make fitting easier.

Arranged on the primary shaft 15 in a known manner are six gear wheels, the so-called gears 7. Five gears for first to fifth gear and one gear for the reverse gear. Also disposed parallel to the primary shaft 15 in the gearbox in a known manner is a secondary shaft 10, which is suitably sectioned and hollow in a known manner. The secondary shaft 10 has six gears 11 in a corresponding manner to the primary shaft. The gears on the respective shaft are disposed in a known manner so that they constantly mesh with one another, by having the gears on the secondary shaft 10 supported on this and using a flange 13 around the secondary shaft which by acting in a known manner determines which gear shall be in driving engagement. Disposed at the ends of the secondary shaft 10 as a final gear is a planetary gear 20A, 20B, Each planetary gear consists of 3 main parts a planet holder 22, a ring wheel 24 and a sun wheel 26. Between these three parts there are a number of interacting rear wheels 28, which are supported on the planet holder 22. (See also FIG. 4). The ring wheel is disposed rotatably, by means of bearings 52, on the gearbox casing 9, but is locked in most cases by a differential mechanism 50, 58, 60, 62 (which is explained in detail below). The sun wheel 26 is connected to the secondary shaft 10 and the planet holder 22 connected via a link mechanism 16A, 16B to an axle shaft 12A, 12B. The link mechanism 16A, B, is suitably of a conventional type, a so-called axle joint. The other end of the axle shaft in turn is connected to a further link mechanism 18, which is formed in the preferred case in this position also by a conventional axle joint 18. The axle joint forms the last link, which connects the transmission to the driving wheel 6 in a known manner. The planetary gear 20A, 20B provides a gear reduction of the speed from the secondary shaft 10 of approx. 3.5:1, so that the speed of the axle shafts 12 is around 30% of the speed of the secondary shaft.

Furthermore, it is shown that the gearbox 8 can advantageously be fitted with a controlled differential brake or a controlled differential mechanism 50 in accordance with the principles shown in SE-9701138, as it can easily be integrated with the planetary gears 20 in such a way that it directly drives/acts on the ring wheel of the planetary gear to obtain a desired speed difference between the driving wheels. It is shown that each ring wheel 24A, 24B is disposed on the casing 9 via bearings 52, so the ring wheel can rotate in relation to the casing 9. Furthermore, it is also shown that the ring wheel 24 has a spur ring 54A, 54B directed outwards. One spur ring 54A meshes with a first gear wheel 56, which is fixedly arranged at one end of a rotating shaft 58, which runs parallel to the primary and secondary shaft. Disposed fixedly at the other end of the shaft is a second gear wheel 60, which meshes with a third gear wheel 62 of the same diameter but roughly twice the width. The third gear wheel also meshes with the second spur ring 54B on the ring wheel, due to which a differential effect can be achieved, by rotation of the shaft 58, which causes the two ring wheels to be rotated in opposite directions. Rotation of the shaft 58 is best achieved by means of a hydraulic motor 50, which drives a gear wheel 64, which in turn drives a gear wheel 66 disposed fixedly on the shaft 58. Otherwise the actual steering mechanism functions suitably as described in SE-9701138. i.e. by means of a link mechanism coupled to the wheel steering and driving of the pump coupled to the axle shaft of the wheels so that the steering deflection of the steering wheel in combination with the speed/velocity determines the magnitude of the speed difference obtained between the driving wheels arranged in parallel.

Figure 2:
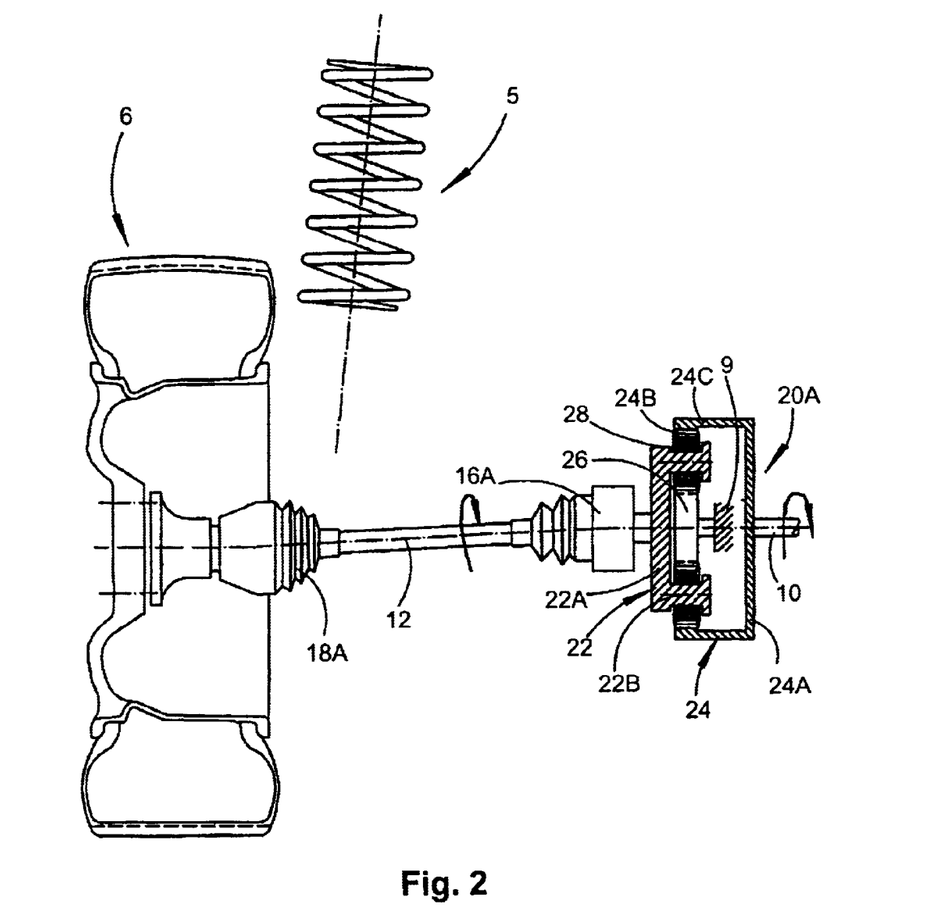
FIG. 2 shows a view in greater detail of the output gear from the gearbox, which is disposed in a preferred manner to the axle shaft.

FIG. 2 shows a planetary gear 20A in greater derail, but with the modification compared with FIG. 1 that one of the parts is fixedly connected to the gearbox casing 9, which means that a differential function (see FIGS. 6A, 6B and FIG. 8) has to be disposed on the secondary shaft 10. The embodiment according to FIG. 2 gives a gear reduction of the speed from the secondary shaft 10 of approx. 1.5:1, so that the speed of the axle shaft 12 is approx. 70% of the speed of the secondary shaft. A planet holder 22 is thus shown which consists of a circular plate 22A, which is connected, coaxially by one side (perhaps as shown in FIG. 2 via a shaft pin) to an axle joint 16A and is fitted on its second side, close to its circumference, with a number of holders 22B extending at right angles. Supported on each holder 22B is a gear wheel 28. Disposed coaxially to the planet holder 22, in engagement with the gear wheels 28, is a sun wheel 26. The sun wheel 26 is fixedly connected to a part belonging to the gearbox casing 9 (shown diagrammatically). The ring wheel 24 consists of a circular plate, which is fixedly connected on one side to the axle joint 16A and has on its other side on the circumference an inwardly directed spur ring 24B which sits at the end of a cylindrical distance ring 24C. The spur ring 24B engages in and interacts with the gear wheels 28, which are supported on the planet holder 22. The axle joint 16A is fixedly connected at its other end to an axle shaft 12. The other end of the axle shaft in turn is connected to a further link mechanism 18. which as above in the preferred case is formed by a conventional axle joint. The planetary gear 20A shown thus provides rotation of the axle shaft 12 which is directed in the same direction as the secondary shaft. It is perceived that the gearbox always has a planetary gear, also at the other end of the secondary shaft, and that the planetary gears can be different and be combined in different ways as exemplified according to FIGS. 2, 3, 4 and 7 and that also a differential function can be obtained directly if the planetary gears are arranged in the manner intended for this, such as is evident for example from FIG. 8.

Thanks to the gear reduction of the planetary gear, which can be between 1.2:1 and 10:1, the gears and shafts in the gearbox can be optimised in a more flexible manner, for example for much less gear reduction work with lower face pressure/torque transmission than is possible with a conventional gearbox, which can be exploited to produce for example a smaller and more compact design or to do otherwise. A gearbox according to the invention functions in the following manner. From the engine 2 a first speed is transmitted via an intermediate transmission 4 to a first gear wheel 7A, which is fixedly connected to the primary shaft 15 in the gearbox 8. By means of the gear changer (not shown), it is decided which flange 13 is engaged and determines which gears 7, 11 shall be in driving engagement. Depending on the exchange gear reduction, a second speed (normally lower than the engine) is thereby obtained at the secondary shaft 10 in the gearbox. With the planetary gear 20, a further gear reduction of the speed is obtained from the secondary shaft 10 to the axle shaft 12, which corresponds to the speed of the driving wheel.

Figure 3:
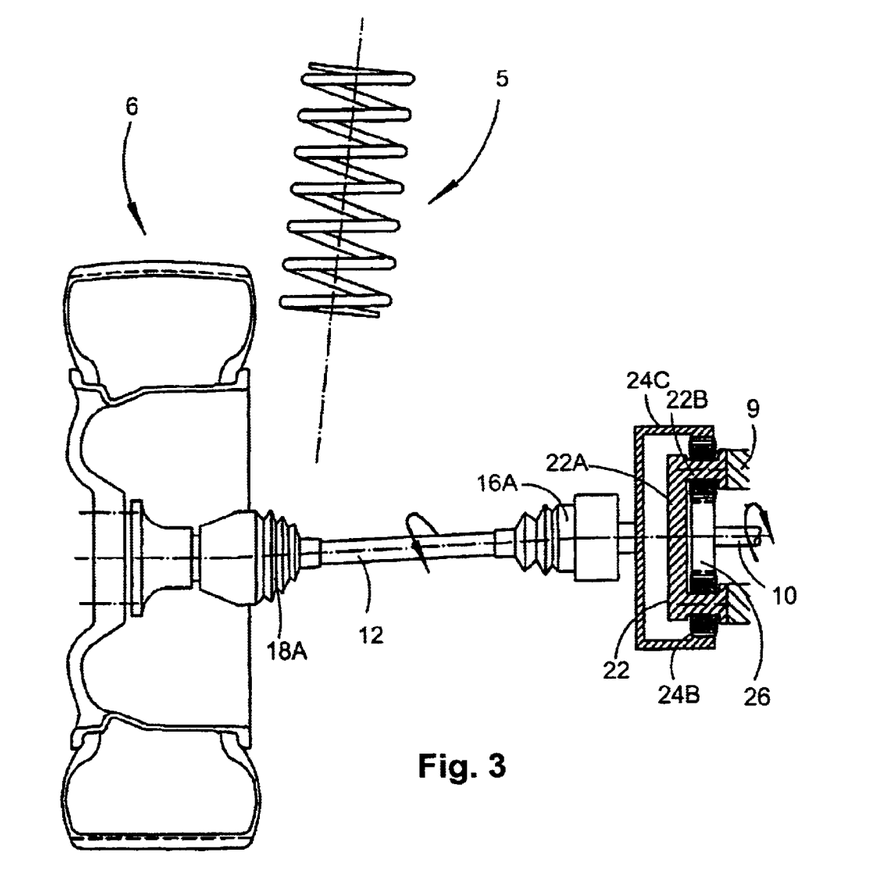
FIG. 3 shows a first alternative for the arrangement in relation to the axle shaft.

FIG. 3 shows a first alternative embodiment for the arrangement of the planetary gear 20A. According to this embodiment, not only is a gear reduction of the speed from the primary shaft 10 obtained, but also a reversed direction of rotation of the axle shaft 12 in relation to the secondary shaft 10. A planet holder 22 is thus shown, which consists of a circular plate 22A, which is fitted on one side, close to its circumference, with a number of holders 22B extending at right angles. Supported on each holder 22B is a gear wheel 28, preferably 4. Each end of each holder 22B is fixedly connected to the casing 9 for the gearbox. Disposed coaxially with the planer holder 22, in engagement with the gear wheels 28, is a sun wheel 26. The sun wheel 26 is fixedly connected to the secondary shaft 10 of the gearbox. The ring wheel 24 consists of a circular plate 24A, which is fixedly connected on one side to an axle joint 16A and which is fitted on its other side, at the circumference, with an inwardly directed spur ring 24B which sits at the end of a cylindrical distance ring 24C. The spur ring 24B engages in and interacts with the gear wheels 28, which are supported on the planet holder 22. The axle joint 16A is fixedly connected at its other end to an axle shaft 12. The other end of the axle shaft is connected in turn to a further link mechanism 18. Similar to the above, there is a gear reduction of the speed from the secondary shaft 10 of approx. 2.5:1, but rotation of the axle shaft 12 is obtained which is opposed to the secondary shaft.

Figure 4:
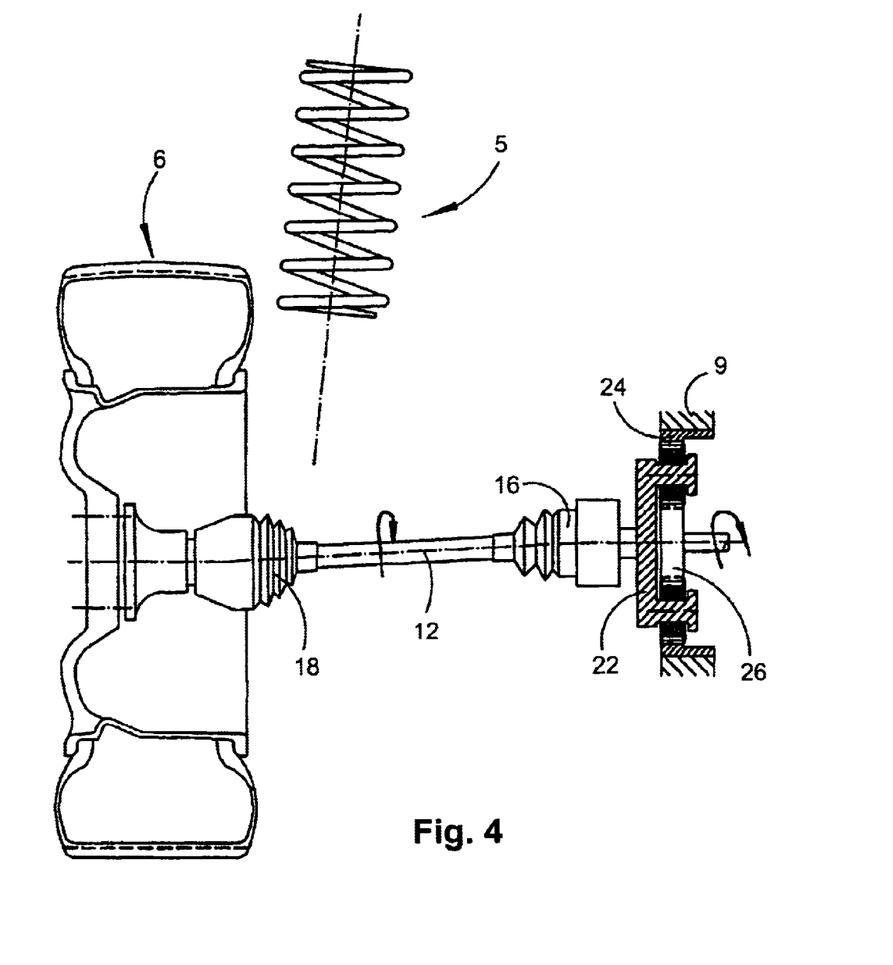
FIG. 4 shows a second alternative for the arrangement in relation to the axle shaft.

FIG. 4 shows a further embodiment of the arrangement of the planetary gear 20A. According to this embodiment, a direction of rotation of the axle shaft 12 is obtained which is the same as the secondary shaft 10, similar to FIG. 2. However, in this embodiment it is the ring wheel 24 which is fixedly connected to the casing 9. The arrangement of the sun wheel 26 is otherwise in accordance with FIG. 3 and the arrangement of the planet holder 24 in accordance with FIG. 2, and the function thereof in principle such as described above with reference to FIG. 2. The exchange gear reduction shown is 3.5:1.

Figure 5:
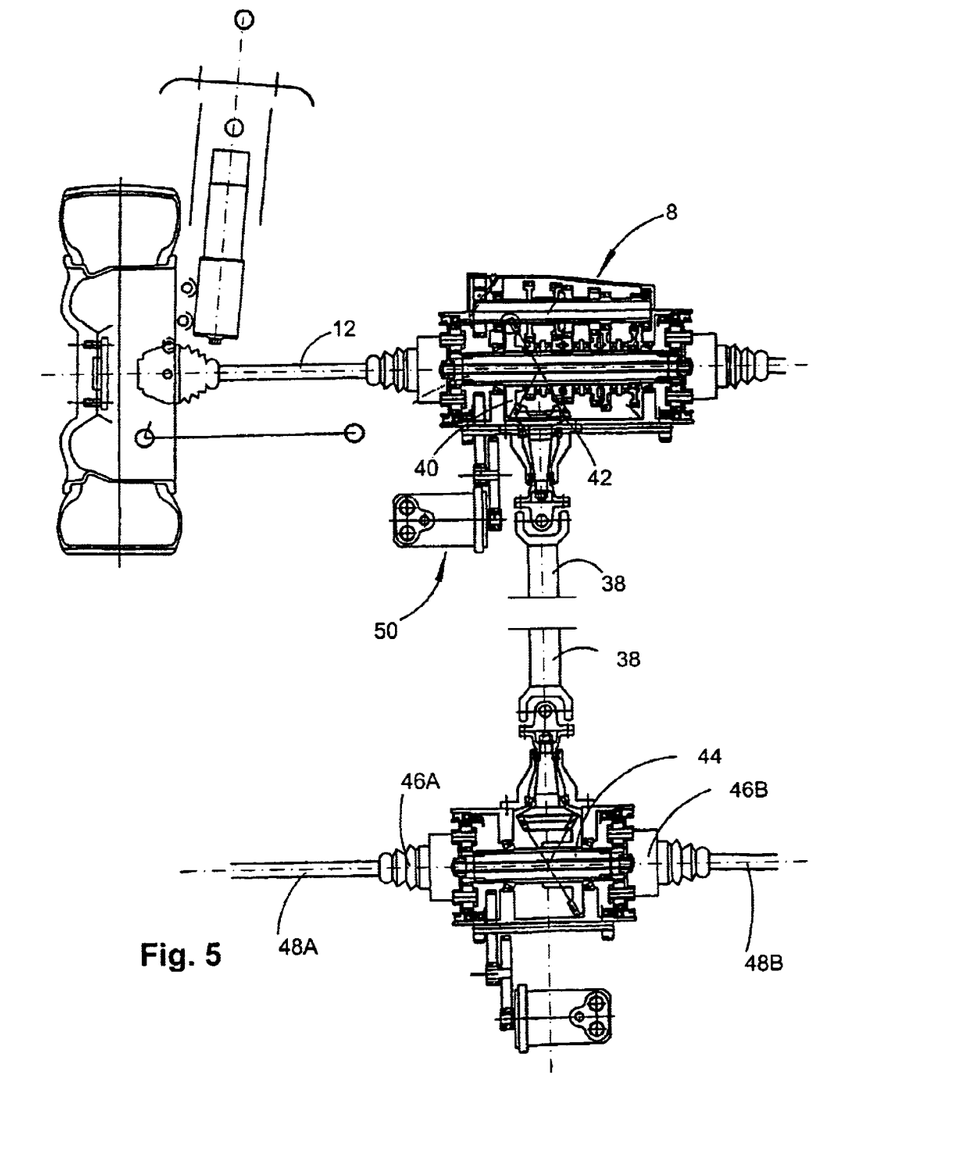
FIG. 5 shows how a gearbox according to FIG. 1 can be provided with a transmission for rear-wheel drive.

FIG. 5 shows a solution for a four-wheel-drive car with a gearbox 8 according to the invention. The gearbox 8 and the transmission of the front wheels are exactly like that described above in relation to FIG. 1. The difference is that disposed on the secondary shaft 10 is a further gear wheel 40 with teeth at an angle which mesh with teeth 42 at the forward end of a propeller shaft 38. The propeller shaft 38 is then disposed in a known manner to a final drive, which comprises a gear shift lever shaft 44, with a gear 43 which meshes with the rear gear 41 of the propeller shaft and two final gears in the form of planetary gears 45A 45B, which are connected to the rear axle shafts 48A, 48B, via axle joints 46A, 46B, in the same way as described in FIG. 1. A controllable differential mechanism 50 of the same type as in FIG. 1 is also disposed on the final drive. A four-wheel transmission with the differential mechanism shown above can thus be fitted in this way.

Figure 6A:
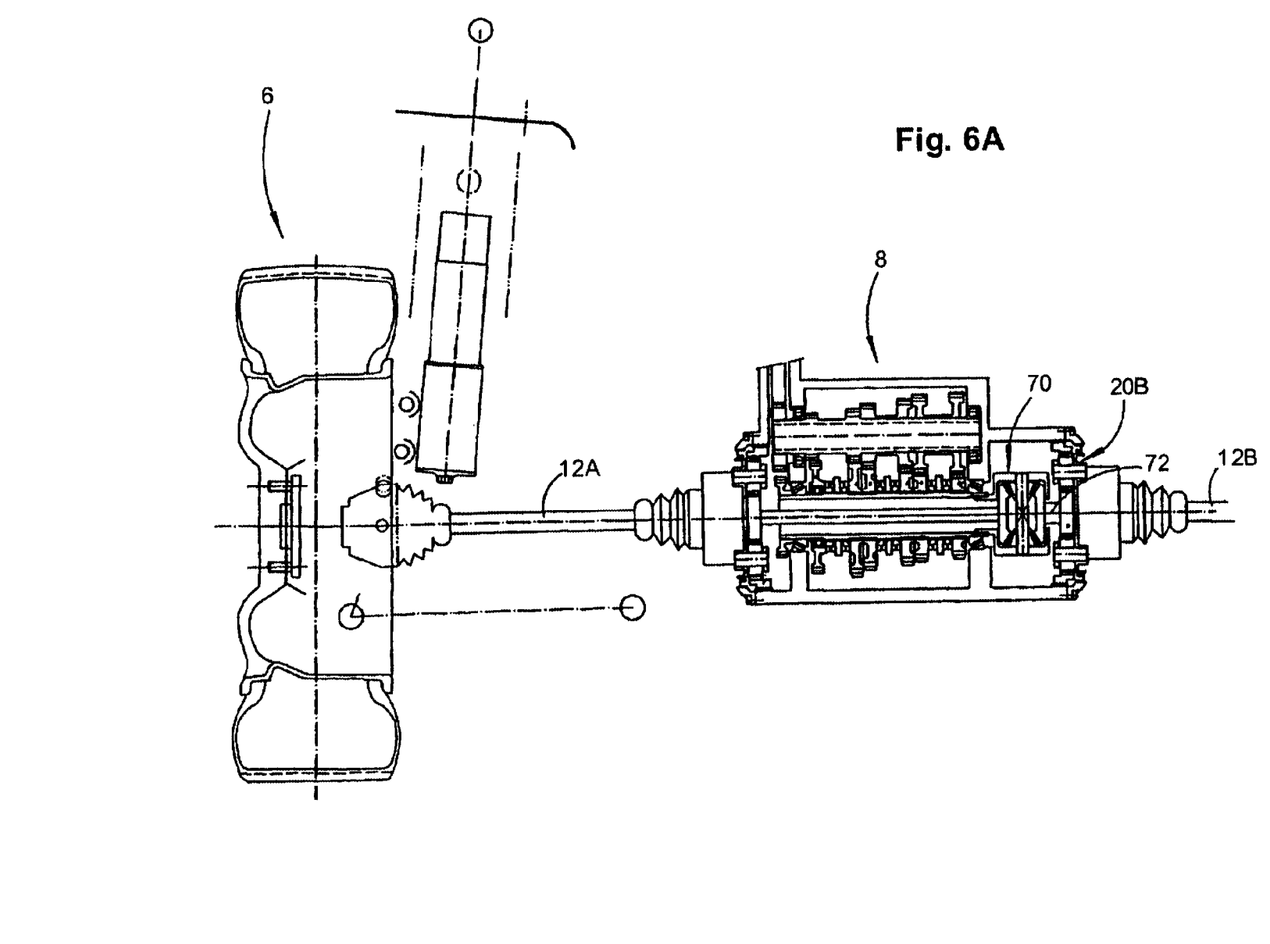
FIGS. 6A, 6B shows how a transmission according to the invention is provided in a preferred manner with a differential mechanism.

FIG. 6A shows how a conventional differential 70 (which can also be braked advantageously in certain applications in an established manner) can be arranged in a simple manner in a gearbox according to the invention. The differential 70 is disposed with one side at one end of the secondary shaft 10 and with the other side on a short axle stump 72, which connects it to the planetary gear 20B, which is suitably formed according to the principles shown in FIG. 4.

Figure 6B:
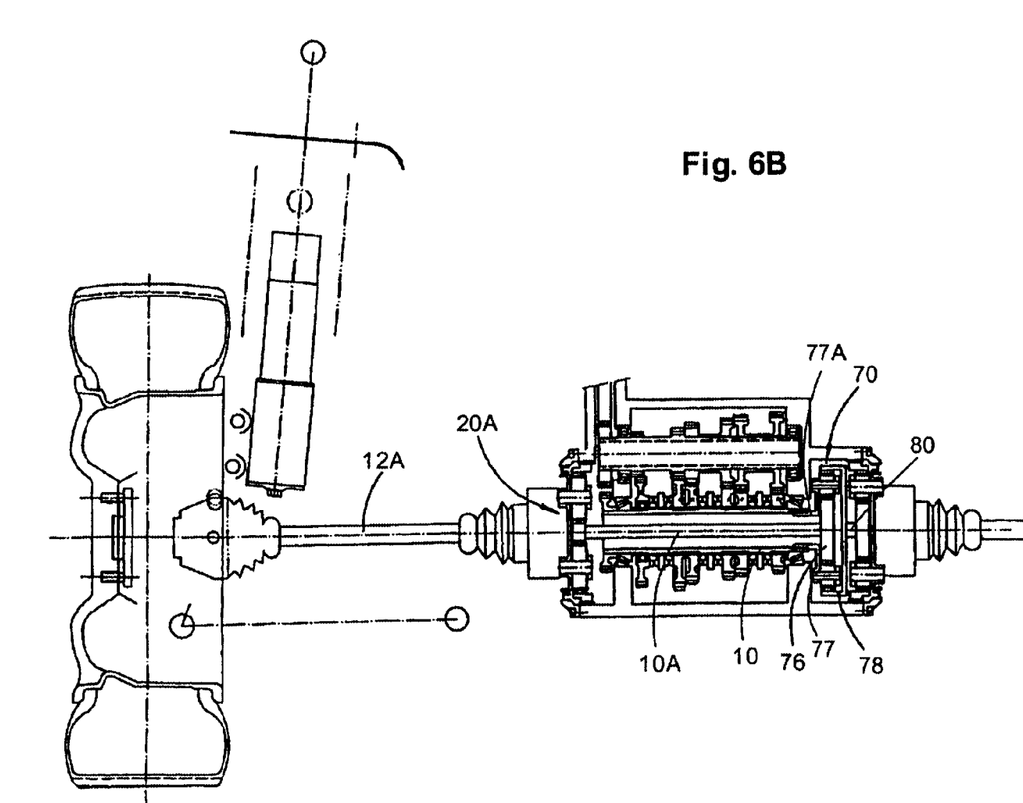

FIG. 6B shows an alternative to using a conventional differential, a planetary gear 70 being used instead. The secondary shaft 10 is connected here in a rotationally fixed manner to the planet holder 77 by being integrated with a tubular element 77A, which inserts with a spline engagement into the hollow secondary shaft. Furthermore, its sun wheel 76 is connected to an inner secondary shaft 10A, which is connected at its other end with the sun wheel for the left-hand final gear 20A. The ring wheel 78 is connected via a shaft link 80 to the sun wheel on the right-hand final gear 20B. It is evident that a differential of this kind takes up less space than a conventional differential. It is also possible to arrange the planetary gear of the differential in the reverse manner in accordance with the principles shown in FIGS. 2, 3 and 4.

Figure 7A:
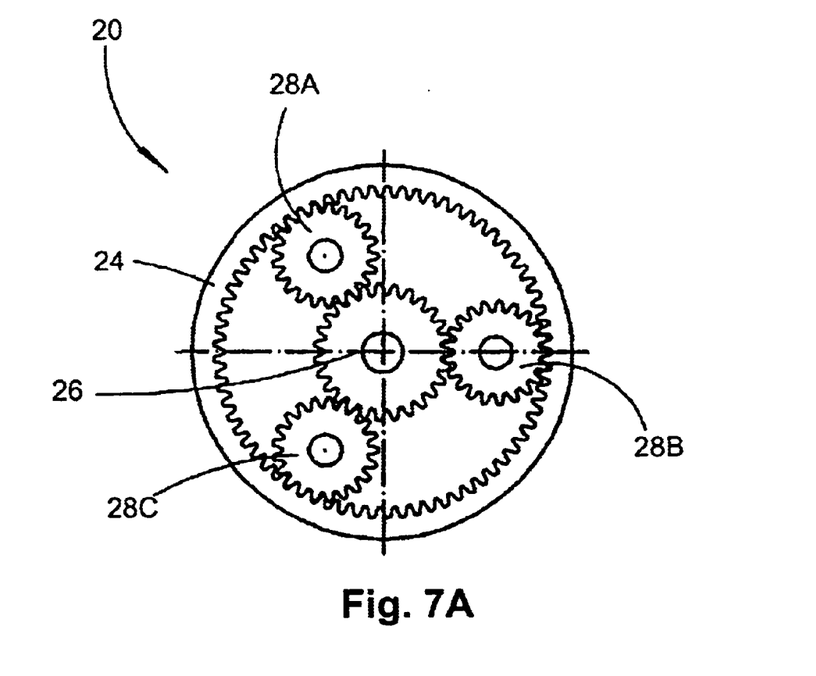
FIGS. 7A, 7B shows a lateral view of two different embodiments of planetary gears.

FIG. 7A shows a side view of a preferred embodiment of a planetary gear 20 intended to be used according to the invention. A planet holder on which three gear wheels 28A, 28B, 28C are arranged, all three of which mesh with the sun wheel 26 on the inner edge and with the ring wheel 24 on the outer edge. The drawing also makes clear one of the major advantages of using a planetary gear compared with a traditional gear reduction set, as it is evident that a planetary gear has three tooth faces which are in engagement constantly to transmit the torque from the input shaft, while traditional gearing only has one tooth face. Since the face pressure is one of the limiting dimensioning factors, it is perceived that a planetary gear with at least three faces in engagement (can be more if more gear wheels are used) can be constructed much more compactly than traditional gearing.

Figure 7B:
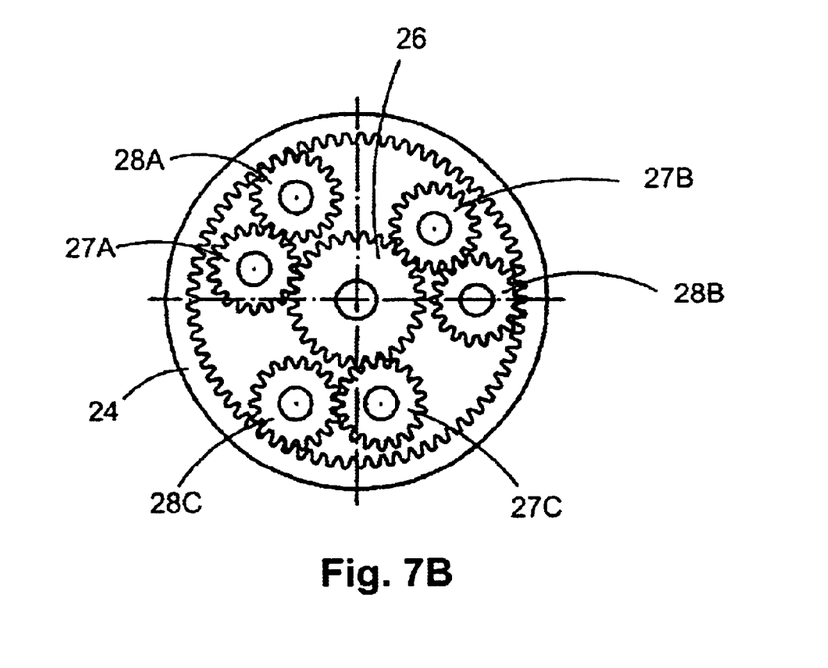

FIG. 7B shows an alternative embodiment of a planetary gear. In addition to a first number of gear wheels 28 A, B, C, which mesh with the ring wheel 24, a further three gear wheels 27 A, B, C feature, which engage between the outer gear wheels 28 and the sun wheel 26, which has the consequence that the direction of rotation on the output shaft is opposed compared with the preferred embodiment shown in FIG. 7A.

Figure 8:
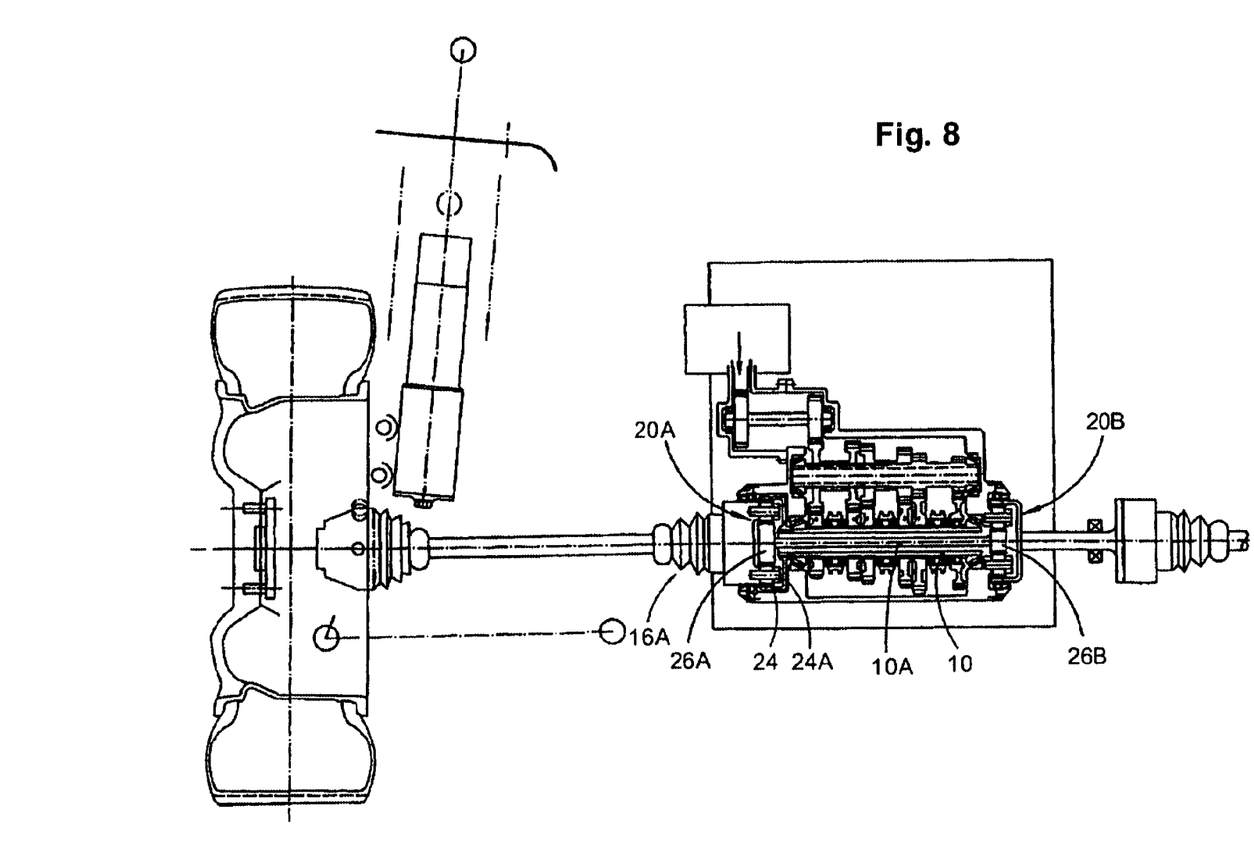
FIG. 8 shows how a transmission according to the invention is disposed so that a differential function is obtained directly.

FIG. 8 shows how two planetary gears 20A, 20B can be arranged so that the differential function directly forms part of a transmission according to the invention. The left-hand planetary gear 20A is arranged according to the principles shown in FIG. 2, and the right-hand planetary gear 20B according to the principles shown in FIG. 3. In addition, the two sun wheels 26A, 26B are rotationally coupled together by means of a shaft 10A. As is evident to the expert, only the left-hand planetary gear 20A is directly coupled to the output shaft 10 by its ring wheel 24 being integrated with a circular arrangement 24A, which in its inner circumference is disposed on a spline on the secondary shaft 10, due to which a rotationally fixed connection is obtained. Thanks to the design shown in FIG. 8, the need for a further device to obtain a differential function is thus eliminated completely. When driving straight forwards (without the need for a differential function), the rotation from the secondary shaft 10 will thus be supplied via the connection 24A with the left-hand ring wheel 24 to the planets in the left-hand final gear 20A and from there on the one hand to the planet holder, to be transferred via the link mechanism 16A to the axle shaft 12 for the left-hand wheel, and on the other hand to the sun wheel 26A in order to be transferred via the inner shaft 10A to the right-hand sun wheel 25B and then to the right-hand wheel, which thus functions in accordance with the principles described in FIG. 3. It is thus noted that to correspond to FIG. 3, it holds good that according to FIG. 8 it is only the inner shaft 10A which is connected to the sun wheel 25B, which can thus have a different speed to the actual secondary shaft 10. For correspondence between FIG. 2 and the left-hand final gear in FIG. 8, it is perceived that the anchoring to the gearbox 9 is exchanged for connection to the inner secondary shaft 10A and that the secondary shaft 10 is changed to be hollow. Similar to what was shown in FIG. 2, it is evident from FIG. 8 that a shaft pin or the like can be disposed between the final gear and the link mechanism 16 (or possibly the two link mechanisms), for example to be able to position components forming part of the transmission in different ways.

A further major advantage of the invention is that it is easy to modify the gear ratio from the gearbox without needing to make any major incursion into this, as the planetary gear is disposed at the outer ends of the gearbox which means that the sun wheel 22 and gear wheels 28 (and possibly 27) can be exchanged without the gearbox otherwise having to be dismantled. On many occasions, however, it is preferred only to make modifications to the gear ratio by changing in the intermediate transmission 4, which in certain cases advantageously has an intermediate shaft to be able to position the transmission point into the primary shaft in a flexible manner, e.g. to be able to increase the space for one axle shaft. Alternatively, the primary shaft can be extended so that it projects beyond the one planetary gear to provide increased space for the axle shaft.

The invention is not otherwise limited to the embodiments shown, but can be varied within the scope of the following claims. Thus it holds good that the principles of the invention can also be utilized in connection with an automatic gearbox, the transmission following this (e.g. crown wheel/differential) having planetary gears as the transmission to the inner ends of the axle shafts. With manual gearboxes of different types also it can be an advantage to fit a final gear according to the invention, e.g. even in the case of that shown in WO-9713990 by fitting the planetary gears on both sides of the differential. Furthermore, it is perceived that a gearbox according to the invention is not only an advantage in connection with front-wheel-driven cars, but can also provide advantages in connection with purely rear-wheel-driven cars, above all in cars with centre-mounted or rear-mounted engines. Furthermore, it is perceived that car is also intended to mean racing cars (e.g. rally cars, F1 cars), in which the invention can be of great significance, not least owing to the good capacity of a planetary gear to transmit large torques. Finally, it is perceived that final gear is taken to mean the last gear reduction changing device forming part of the transmission for transmitting torque/rotation from the engine to the axle shaft, and that a gearbox according to the invention can advantageously also be used with non-controlled brake units, for example of the visco- or multiple-disc type.

What is claimed is:

1. A transmission for a car,
said car comprising a number of suspended wheel pairs, a transmission to drive at least one of said wheel pairs, to form at least one pair of drive wheels, and an engine to drive said transmission, said transmission comprising a gearbox having a primary transmission part, a secondary shaft and a pair of final gears connected to said secondary shaft, a pair of axel shafts connecting each one of said drive wheels with one of each said pair of final gears, a first pair of axle joints pivotally connecting each of said shafts to one each of said pair of final gears and a second pair of axel joints pivotally connecting each of said shafts to a respective drive wheel, to provide sufficient wheel suspension for said drive wheels, wherein each one of said final gears comprises planetary gear sets, which planetary gear sets provide an exchange gear reduction of between 1.2:1 and 10:1 of the rotational speed from said secondary shaft to said axle shafts.

2. Transmission according to claim 1, characterized by an intermediate transmission between the engine and the gearbox.

3. Transmission according to claim 2, characterized in that the exchange gear reduction in the intermediate transmission and/or in the planetary gear sets is adapted to an optimum speed range of the engine, so that a same kind of primary transmission part and a same kind of secondary shaft and gear can be used in an optimum manner for several kinds of engines with different kinds of speed ranges.

4. Transmission according to claim 2, characterized in that said planetary gear sets provide an exchange gear reduction of at least 2:1.

5. Transmission according to claim 2, characterized in that said planetary gear sets provide an exchange gear reduction of approximately 3.5:1.

6. Transmission according to claim 1, characterized in that said planetary gear sets provide an exchange gear reduction of at least 2:1.

7. Transmission according to claim 1, characterized in that each of said driving wheels comprise a fulcrum and that said secondary shaft is arranged parallel to at least an imaginary plane which either comprises the fulcrum for both driving wheels or a horizontal plane of a chassis of the car.

8. Transmission according to claim 7, characterized in that the secondary shaft is arranged parallel to both the above mentioned planes.

9. Transmission according to claim 1, characterized in that said planetary gear sets comprise a planet holder, a ring wheel and a sun wheel, and gear wheels supported on the planet holder, the planet holder, ring wheel or sun wheel being fixedly or adjustably connected to a fixed part of the car, preferably a casing for the gearbox, while the sun wheel is connected to a secondary shaft forming part of the gearbox and a component of the ring wheel is connected to an axle joint that is connected to the axle shaft.

10. Transmission according to claim 9, characterized in that the ring wheel is disposed fixedly or adjustably on the casing.

11. Transmission according to claim 9, characterized in that a differential lock or controlled differential mechanism is disposed on the gearbox in interaction with said planetary gear sets, preferably via the ring wheel.

12. Transmission according to claim 1, characterized in that a length of an axle shaft with axle joints is between 100–1000 mm, preferably between 200–700 mm.

13. Transmission according to claim 1, characterized in that said transmission is mounted in an engine compartment together with a transverse engine.

14. Transmission according to claim 1, characterized in that there is also a backwardly disposed transmission from the gearbox, the exchange gear reduction for the backwardly disposed transmission corresponding to the exchange gear reduction from the planetary gear sets to the forward axle shafts so that four-wheel operation can be obtained at the same speed of front and rear wheels.

15. Transmission according to claim 1, characterized in that the gearbox comprises a primary shaft with input gears and a secondary shaft with output gears.

16. Transmission according to claim 1, characterized in that said secondary shaft is arranged transversely to a longitudinal direction of the car and positioned in an area between the driving wheels.

17. Transmission according to claim 1, characterized in that the planetary gear sets are disposed coaxially in relation to said secondary shaft.

18. Transmission according to claim 1, characterized in that said planetary gear sets provide an exchange gear reduction of approximately 3.5:1.

* * * * *